United States Patent
Zhang et al.

(10) Patent No.: US 8,296,905 B2
(45) Date of Patent: Oct. 30, 2012

(54) HINGE MECHANISM

(75) Inventors: Han-Zheng Zhang, Shenzhen (CN); Lian-Cheng Huang, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/093,062

(22) Filed: Apr. 25, 2011

(65) Prior Publication Data

US 2012/0192381 A1 Aug. 2, 2012

(51) Int. Cl.
*E05D 3/06* (2006.01)

(52) U.S. Cl. .............. 16/366; 16/340; 16/330

(58) Field of Classification Search .......... 16/366, 16/368, 369, 340, 337, 334, 389, 357, 360, 16/361; 361/679.6, 679.9, 679.17; 248/917–923, 248/284.1; 379/433.12, 433.13; 455/575.1, 455/575.3, 575.4, 550.1, 90.3; 348/333.06, 348/373, 794

See application file for complete search history.

(56) References Cited

U.S. PATENT DOCUMENTS

| | | | |
|---|---|---|---|
| 6,253,419 B1* | 7/2001 | Lu | 16/340 |
| 6,581,893 B1* | 6/2003 | Lu | 248/291.1 |
| 6,618,903 B2* | 9/2003 | Kim | 16/337 |
| 7,319,749 B2* | 1/2008 | Lu et al. | 379/433.13 |
| 7,484,269 B2* | 2/2009 | Chih et al. | 16/340 |
| 7,513,011 B2* | 4/2009 | Lu et al. | 16/337 |
| 7,515,707 B2* | 4/2009 | Ka et al. | 379/433.12 |
| 7,669,287 B2* | 3/2010 | Lee et al. | 16/340 |
| 7,730,587 B2* | 6/2010 | Chang et al. | 16/340 |
| 7,861,377 B2* | 1/2011 | Chuan | 16/338 |
| 2008/0109995 A1* | 5/2008 | Kuwajima et al. | 16/354 |
| 2009/0070961 A1* | 3/2009 | Chung et al. | 16/354 |
| 2011/0265288 A1* | 11/2011 | Chiang | 16/341 |

* cited by examiner

*Primary Examiner* — Chuck Y. Mah

(74) *Attorney, Agent, or Firm* — Altis Law Group, Inc.

(57) ABSTRACT

A hinge mechanism includes a first rotation assembly, a second rotation assembly substantially parallel to the first rotation assembly, a brace member, a connection shaft partially received in the sliding slot, a first connection member, and a second connection member. The first rotation assembly includes a first pivoting shaft and a first bracket sleeved on the first pivoting shaft. The first bracket includes a mounting portion eccentrically formed on one end of the first bracket. The second rotation assembly includes a second pivoting shaft and a second bracket sleeved on the second pivoting shaft. The second bracket includes a mounting portion eccentrically formed on the second bracket. The brace member defines a sliding slot. An end of the first connection member is eccentrically connected to the first pivoting shaft, and the other end of the first connection member is connected to the connection shaft.

18 Claims, 3 Drawing Sheets

HINGE MECHANISM

BACKGROUND

1. Technical Field

The present disclosure generally relates to hinges, and more particularly to a hinge mechanism applied in an electronic device.

2. Description of Related Art

Many electronic devices, such as notebook computers, game players, electronic books, and mobile phones include hinged elements. To ensure that one part of an electronic device is capable of rotating relative to the other part and that the electronic device can be opened or closed more smoothly and quickly, a hinge mechanism applied in the electronic device includes four gears to transmit the torque.

However, the gears occupy a large amount of space, which negatively impacts the ability for miniaturizing the electronic device. Additionally, the gears must be assembled to mesh accurately to avoid any unsmooth rotation or even the jamming of the hinge mechanism.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

The present embodiment of a hinge mechanism may be applied in any electronic device having two or more hinged parts, such as notebook computers, LCD monitors, or DVD players. In this embodiment, the hinge mechanism described and illustrated is applied in a notebook computer.

Figure 1:
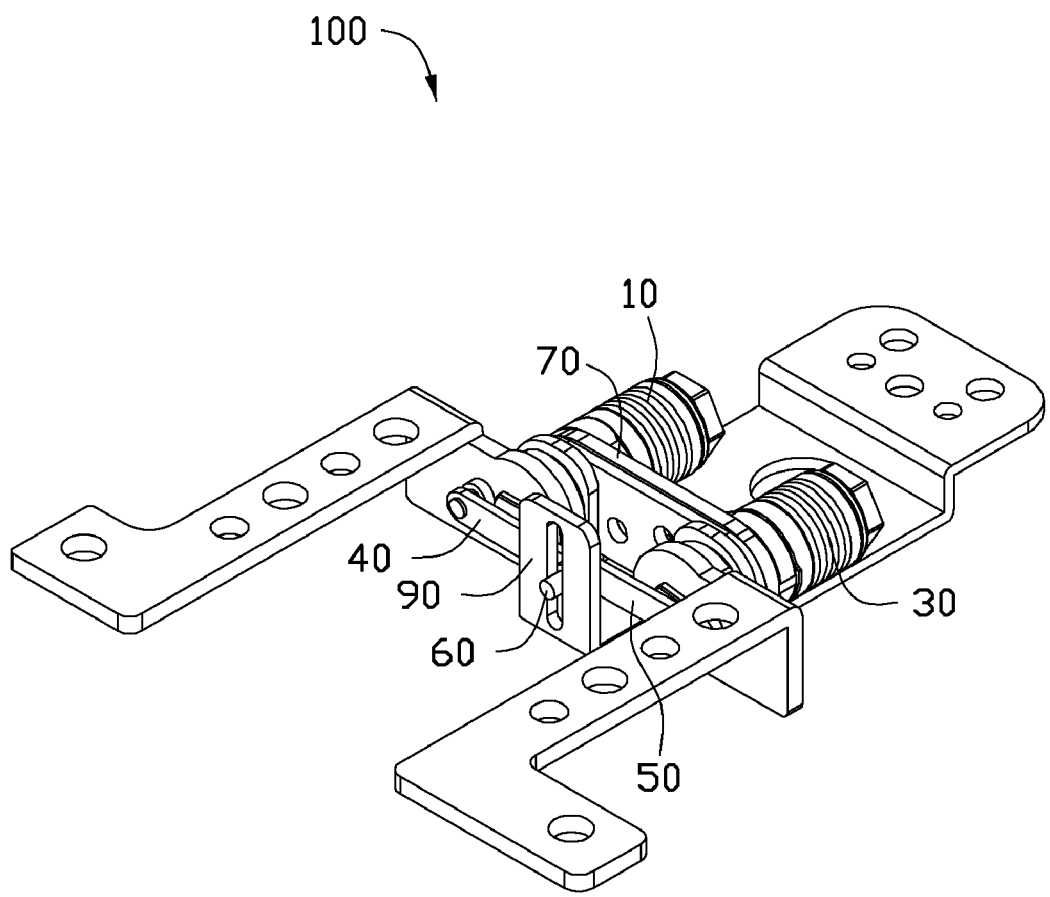
FIG. 1 is an assembled, isometric view of one embodiment of a hinge mechanism.

Referring to FIG. 1, a hinge mechanism 100 includes a first rotation assembly 10, a second rotation assembly 30 substantially parallel with the first rotation assembly 10, a first connection member 40, a second connection member 50, a connection shaft 60, a reinforcement assembly 70, and a brace member 90.

Figure 2:
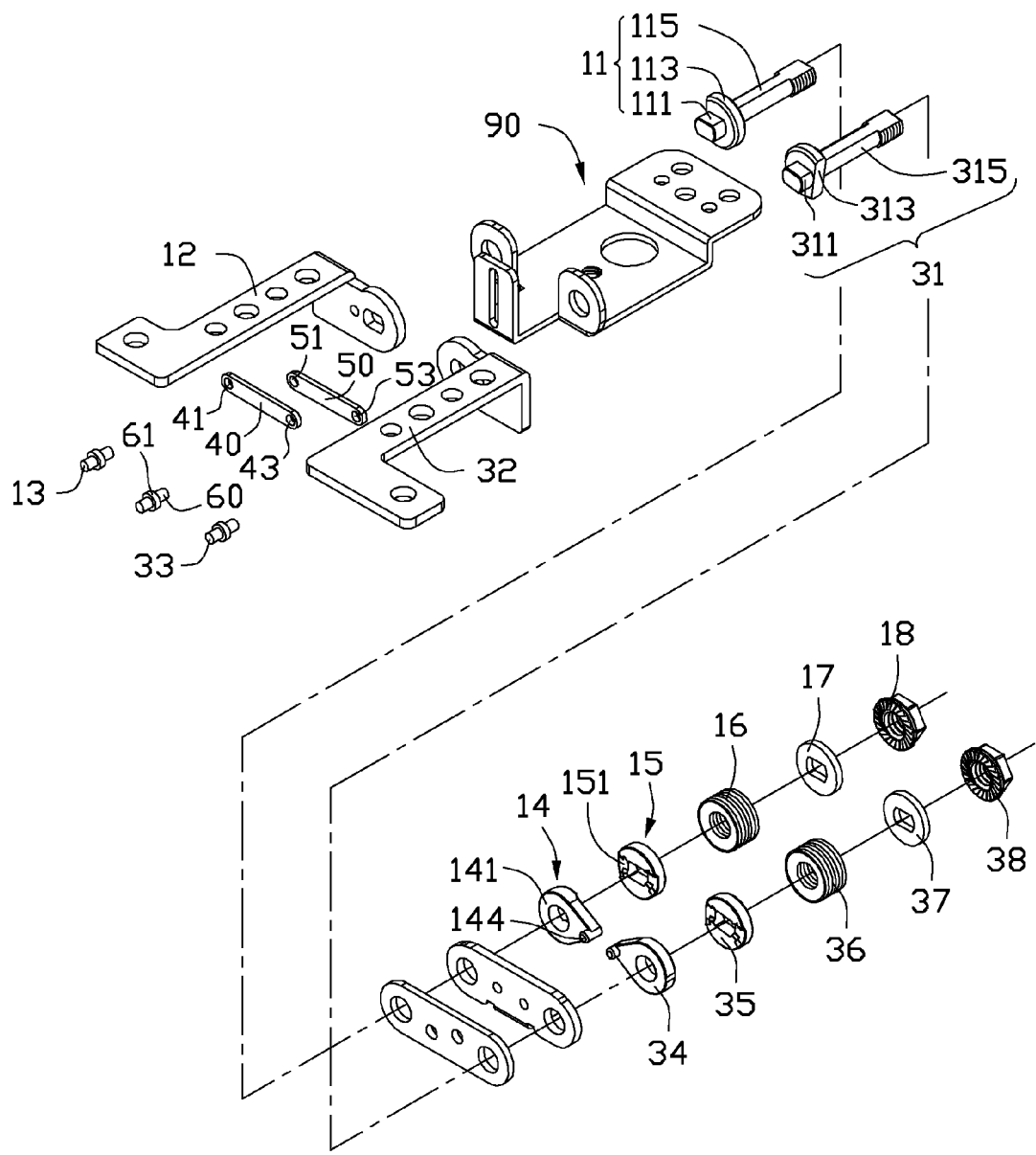
FIG. 2 is an exploded, isometric view of the hinge mechanism of FIG. 1.
Figure 3:
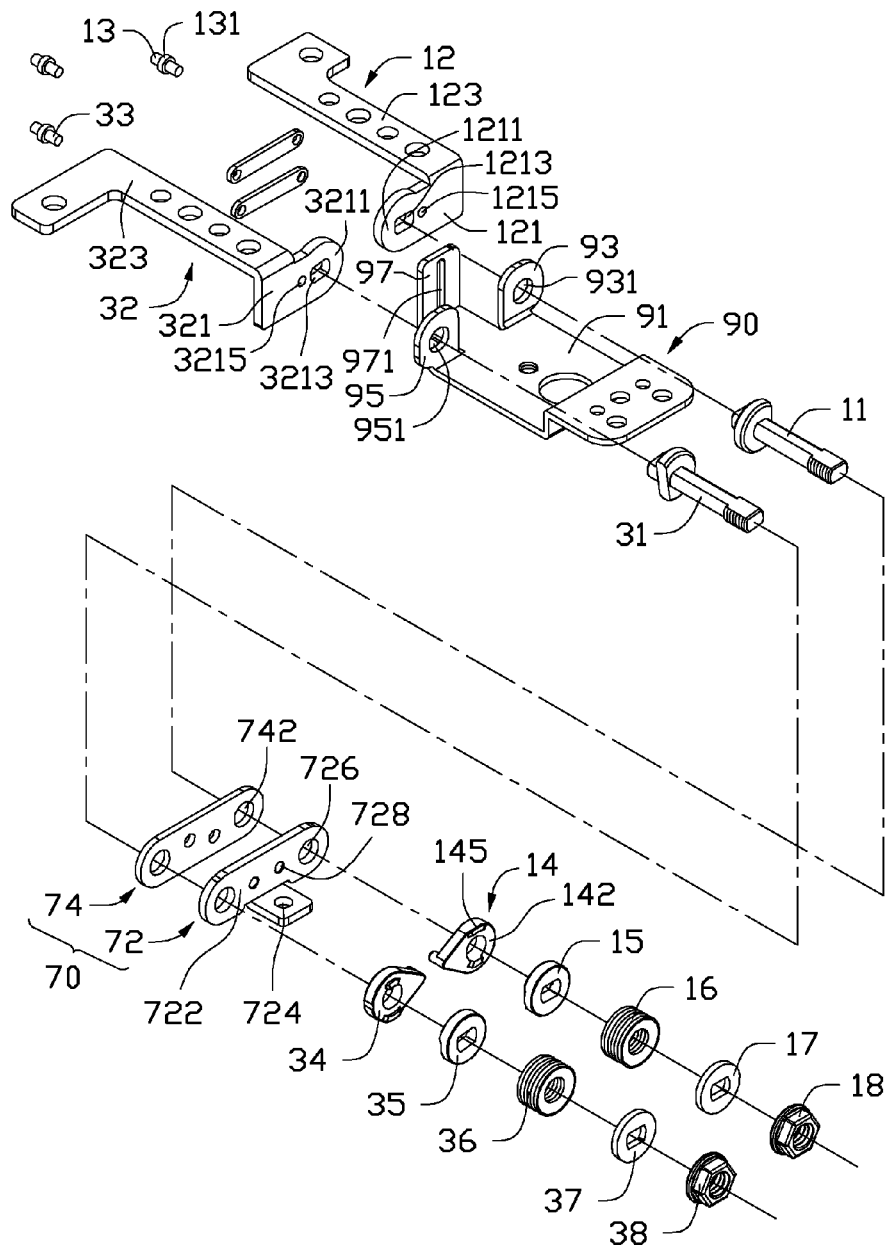
FIG. 3 is similar to FIG. 2, but viewed from another aspect.

Also referring to FIGS. 2 and 3, the first rotation assembly 10 includes a first pivoting shaft 11, a first bracket 12, a first rotary shaft 13, a cam 14, a cam follower 15, a plurality of resilient members 16, a friction member 17, and a fastener 18. The fastener 18 engages with one end of the first pivoting shaft 11. The first bracket 12, the cam 14, the cam follower 15, the resilient members 16, and the friction member 17 are sleeved on the first pivoting shaft 11 in that order. The first bracket 12, the resilient member 16, the cam follower 15, the friction member 17, and the fastener 18 are non-rotatable relative to the first pivoting shaft 11.

The first pivoting shaft 11 includes a fixing portion 111, a flange 113 formed on the fixing portion 111, and a pivoting portion 115 which is non-circular. The pivoting portion 115 is a threaded non-circular rod.

The first bracket 12 includes a mounting portion 121 and an extending portion 123 substantially perpendicularly extending from a side surface of the mounting portion 121. The mounting portion 121 forms a semicircular mounting end 1211. The mounting portion 121 is substantially a plate defining an irregular mounting hole 1213 corresponding to the fixing portion 111 of the first pivoting shaft 11. The mounting portion 121 eccentrically defines a shaft hole 1215 at an end away from the mounting end 1211. That is, an axis of the shaft hole 1215 does not align with an axis of the mounting portion 121. The extending portion 123 is substantially a sheet.

The first rotary shaft 13 is substantially cylindrical and forms a stopping portion 131 in a central portion (not labeled) thereof. In the illustrated embodiment, the stopping portion 131 is a flange formed on an outer surface of the first rotary shaft 13.

The cam 14 includes a first end surface 141, a second end surface 142 opposite to the first end surface 141, a locking post 144, and two latching protrusions 145. The locking post 144 perpendicularly extends from the first end surface 141. The latching protrusions 145 are formed on the second end surface 142. Alternatively, the number of the latching protrusions 145 may be one, three, four or more.

The cam follower 15 defines at least one cutout 151 recessed in an end surface (not labeled) thereof facing the second end surface 142 and engaging with the latching protrusions 145. In the illustrated embodiment, the cam follower 15 defines two cutouts 151. In alternative embodiments, the cam follower 15 may define one, or more than two cutouts 151, or alternatively, the cam follower 15 may form any number of protrusions thereon, and the cam 14 defines the corresponding number of cutouts 151.

In the illustrated embodiment, the resilient members 16 are a plurality of disk-shaped elastic washers. The friction member 17 is a flat washer. The fastener 18 is a flanged screw nut. Alternatively, the first rotation assembly 10 may include a helical spring, an elastic rubber sleeve, or other elastic member instead, and the fastener 18 may be a rivet, and then the first pivoting shaft 11 correspondingly defines a pin hole.

The structure of the second rotation assembly 30 is the same as that of the first rotation assembly 10. The second rotation assembly 30 includes a second pivoting shaft 31 and a second bracket 32, a second rotary shaft 33, a cam 34, a cam follower 35, a plurality of resilient members 36, and a friction member 37 sleeved on the second pivoting shaft 31 in that order, and a fastener 38 engaging with one end of the second pivoting shaft 31. The structures of the elements of the second rotation assembly 30 are similar to those of the respective corresponding elements of the first rotation assembly 10. The second bracket 32, the resilient member 16, the cam follower 35, the friction member 37, and the fastener 38 are non-rotatable relative to the second pivoting shaft 31.

The first connection member 40 is a cross bar or plate. The first connection member 40 defines a first receiving hole 41 at an end and a second receiving hole 43 at the other end thereof.

The second connection member 50 is the same as the first connection member 40. The second connection member 50 defines a first connecting hole 51 at an end and a second connecting hole 53 at the other end thereof.

The connection shaft 60 forms an urging portion 61. In the illustrated embodiment, the urging portion 61 is a flange at an outer surface of the connection shaft 60.

The reinforcement assembly 70 includes a first reinforcement member 72 and a second reinforcement member 74. The first reinforcement member 72 includes a base 722 and a contacting portion 724. The base 722 defines two through holes 726 corresponding to the first pivoting shaft 11 and the second pivoting shaft 31 respectively, and two positioning holes 728 corresponding to the locking post 144 and a post (not labeled) of the cam 34 respectively. The two positioning holes 728 are between the two through holes 726. The contacting portion 724 perpendicularly extends from the base 722.

The second reinforcement member 74 is substantially the same as the base 722 of the first reinforcement member 72. The second reinforcement member 74 defines two through holes 742 corresponding to the first pivoting shaft 11 and the second pivoting shaft 31, respectively.

The brace member 90 includes an engaging portion 91, a first ear 93, a second ear 95, and a bent portion 97. The first ear 93 and the second ear 95 are formed on an edge of the engaging portion 91 and spaced from each other. The first ear 93 defines a first shaft hole 931 corresponding to the first pivoting shaft 11. The second ear 95 defines a second shaft hole 951 corresponding to the second pivoting shaft 31. The bent portion 97 is disposed between the first ear 93 and the second ear 95. The bent portion 97 defines a sliding slot 971 extending along a direction perpendicular to the engaging portion 91.

During assembly of the hinge mechanism 100, the fixing portion 111 of the first pivoting shaft 11 extends through the first shaft hole 931 of the first ear 93 and the mounting hole 1213. The pivoting portion 115 extends through the through hole 742 of the second reinforcement member 74, the through hole 726 of the first reinforcement member 72, the cam 14, the cam follower 15, the resilient member 16, and the friction member 17 in that order. When the flange 113 of the first pivoting shaft 11 is blocked or abutted by the first ear 93, the fastener 18 threadedly engages with the pivoting portion 115 of the first pivoting shaft 11, thus locking the respective elements on the first pivoting shaft 11. The resilient member 16 provides an axial force, to secure each of the respective elements on the first pivoting shaft 11 which are contacting with other respective adjoining elements. The locking post 144 is inserted into the positioning hole 728 of the first reinforcement member 72, which is adjacent to the through hole 726 of the first pivoting shaft 11. The first end surface 141 of the cam 14 contacts with the first reinforcement member 72, and the second end surface 142 contacts with the cam follower 15. The contacting portion 724 is mounted on the engaging portion 91 of the brace member 90. Adopting the same assembly process, a fixing portion 311 of the second pivoting shaft 31 is inserted into a mounting hole 3213, then the second ear 95, the second reinforcement member 74, the first reinforcement member 72, the cam 34, the cam follower 35, the resilient member 36, the friction member 37, and the fastener 38 are sleeved on the second pivoting shaft 31 in that order.

The connection shaft 60 extends through the first receiving hole 41 of the first connection member 40 and the first connecting hole 51, respectively, and is inserted into the sliding slot 971 of the bent portion 97, thus the first connection member 40 and the second connection member 50 can be held by the connection shaft 60 and the bent portion 97. The first rotary shaft 13 passes through the second receiving hole 43 of the first connection member 40 and the shaft hole 1215 of the first bracket 12. The second pivoting shaft 31 extends through the second connecting hole 53 and a shaft hole 3215, to complete the hinge mechanism 100 assembly. The sliding slot 971 extends perpendicularly to an axis around which the first rotation assembly 10 and the second rotation assembly 30 are rotated.

When the hinge mechanism 100 is rotated, the cam 14 rotates relative to the cam follower 15, such that the latching protrusions 145 of the cam 14 are received in or slided out of the cutouts 151 of the cam follower 15. Thereby, the axial force exerted between the elements sleeved on the first pivoting shaft 11 is changeable during rotation, and the axial force exerted between the elements sleeved on the second pivoting shaft 31 is also changeable in a same way. Furthermore, the hinge mechanism 100 is capable of being maintained or set at a number of predetermined positions by the engagement of the cam 14 and the cam follower 15 and the engagement of the cam 34 and the cam follower 35.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge mechanism, comprising:
a first rotation assembly comprising a first pivoting shaft and a first bracket sleeved on the first pivoting shaft, the first bracket comprising a mounting portion eccentrically formed on one end of the first bracket;
a second rotation assembly substantially parallel to the first rotation assembly and comprising a second pivoting shaft and a second bracket sleeved on the second pivoting shaft, the second bracket comprising a mounting portion eccentrically formed on one end of the second bracket;
a brace member defining a sliding slot;
a connection shaft partially received in the sliding slot, and slidable relative to the brace member; and
a first connection member and a second connection member, wherein an end of the first connection member is eccentrically connected to the mounting portion of the first bracket, the other end of the first connection member is connected to the connection shaft, an end of the second connection member is eccentrically connected to the mounting portion of the second bracket, and the other end of the second connection member is connected to the connection shaft.

2. The hinge mechanism of claim 1, wherein the first rotation assembly further comprises a cam sleeved on the first pivoting shaft, and the second rotation assembly further comprises a cam sleeved on the second pivoting shaft.

3. The hinge mechanism of claim 2, wherein the first rotation assembly further comprises a cam follower non-rotatably sleeved on the first pivoting shaft, the cam follower is adjacent to the cam; one of the cam and the cam follower defines at least one cutout at an end surface facing the other one of the cam and the cam follower, and the other one of the cam and the cam follower forms at least one latching protrusion protruding from an end surface corresponding to the at least one cutout.

4. The hinge mechanism of claim 2, further comprising a first reinforcement member rotatably connected to the first pivoting shaft and the second pivoting shaft, respectively, wherein the first reinforcement member defines two positioning holes, each cam forms a locking post, and each locking post is received in one positioning hole.

5. The hinge mechanism of claim 4, wherein the first reinforcement member comprises a base and a contacting portion on the base, the positioning hole is defined on the base, the first pivoting shaft and the second pivoting shaft are connected to the base, and the contacting portion is fixed on the brace member.

6. The hinge mechanism of claim 5, further comprising a second reinforcement member adjacent to the first reinforcement member, and the second reinforcement member is connected to the first pivoting shaft and the second pivoting shaft, respectively.

7. The hinge mechanism of claim 1, wherein the brace member comprises an engaging portion, a first ear, a second ear and a bent portion disposed between the first ear and the second ear, and the sliding slot is defined on the bent portion.

8. The hinge mechanism of claim 1, wherein the first rotation assembly further comprises a first rotary shaft interconnecting the first pivoting shaft and the first connection member; and the second rotation assembly further comprises a second rotary shaft interconnecting the second pivoting shaft and the second connection member.

9. The hinge mechanism of claim 8, wherein the first bracket eccentrically defines a shaft hole and a mounting hole for the first pivoting shaft passing through, the first rotary shaft is received in the shaft hole; the second bracket eccentrically defines a shaft hole and a mounting hole for the second pivoting shaft passing through, and the second rotary shaft is received in the shaft hole of the second bracket.

10. A hinge mechanism, comprising:
a first rotation assembly comprising a first pivoting shaft and a first bracket sleeved on the first pivoting shaft, the first bracket comprising a mounting portion eccentrically formed on one end of the first bracket;
a second rotation assembly substantially parallel to the first rotation assembly and comprising a second pivoting shaft and a second bracket sleeved on the second pivoting shaft, the second bracket comprising a mounting portion eccentrically formed on one end of the second bracket;
a brace member defining a sliding slot;
a connection shaft partially received in the sliding slot, and slidable relative to the brace member;
a first connection member and a second connection member, wherein an end of the first connection member is eccentrically connected to the mounting portion of the first bracket, the other end of the first connection member is connected to the connection shaft, an end of the second connection member is eccentrically connected to the mounting portion of the second bracket, and the other end of the second connection member is connected to the connection shaft, and the sliding slot extends along a direction perpendicularly to an axis of the connection shaft.

11. The hinge mechanism of claim 10, wherein the first rotation assembly further comprises a cam sleeved on the first pivoting shaft; the second rotation assembly further comprises a cam sleeved on the second pivoting shaft.

12. The hinge mechanism of claim 11, wherein the first rotation assembly further comprises a cam follower non-rotatably sleeved on the first pivoting shaft, the cam follower is adjacent to the cam; one of the cam and the cam follower defines at least one cutout at an end surface facing the other one of the cam and the cam follower, and the other one of the cam and the cam follower forms at least one latching protrusion protruding from an end surface corresponding to the at least one cutout.

13. The hinge mechanism of claim 11, further comprising a first reinforcement member rotatably connected to the first pivoting shaft and the second pivoting shaft, respectively, the first reinforcement member defines two positioning holes, each cam forms a locking post, and each locking post is received in a positioning hole.

14. The hinge mechanism of claim 13, wherein the first reinforcement member comprises a base and a contacting portion on the base, the positioning hole is defined on the base, the first pivoting shaft and the second pivoting shaft are connected to the base, and the contacting portion is fixed on the brace member.

15. The hinge mechanism of claim 14, further comprising a second reinforcement member adjacent to the first reinforcement member, and the second reinforcement member is connected to the first pivoting shaft and the second pivoting shaft.

16. The hinge mechanism of claim 10, wherein the brace member comprises an engaging portion, a first ear, a second ear and a bent portion disposed between the first ear and the second ear, and the sliding slot is defined on the bent portion.

17. The hinge mechanism of claim 10, wherein the first rotation assembly further comprises a first rotary shaft interconnecting the first rotation shaft and the first connection member; the second rotation assembly further comprises a second rotary shaft interconnecting the second pivoting shaft and the second connection member.

18. The hinge mechanism of claim 17, wherein the first bracket eccentrically defines a shaft hole and a mounting hole for the first pivoting shaft passing through, the first rotary shaft is received in the shaft hole; the second bracket eccentrically defines a shaft hole and a mounting hole for the second pivoting shaft passing through, and the second rotary shaft is received in the shaft hole of the second bracket.

* * * * *